United States Patent
Günther et al.

(10) Patent No.: US 12,308,462 B2
(45) Date of Patent: May 20, 2025

(54) BATTERY HOUSING COMPRISING A SPACER

(71) Applicant: Kirchhoff Automotive Deutschland GmbH, Attendorn (DE)

(72) Inventors: Alexander Günther, Olpe (DE); Maria Schmitt, Attendorn (DE); Dominik Ax, Finnentrop (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 676 days.

(21) Appl. No.: 17/636,321

(22) PCT Filed: Sep. 7, 2020

(86) PCT No.: PCT/EP2020/074953
§ 371 (c)(1),
(2) Date: Feb. 17, 2022

(87) PCT Pub. No.: WO2021/048054
PCT Pub. Date: Mar. 18, 2021

(65) Prior Publication Data
US 2022/0294071 A1 Sep. 15, 2022

(30) Foreign Application Priority Data
Sep. 9, 2019 (DE) ...................... 10 2019 124 060.3
Sep. 9, 2019 (DE) ...................... 10 2019 124 061.1

(51) Int. Cl.
*H01M 50/00* (2021.01)
*B60K 1/04* (2019.01)
(Continued)

(52) U.S. Cl.
CPC ............. *H01M 50/291* (2021.01); *B60K 1/04* (2013.01); *H01M 50/24* (2021.01);
(Continued)

(58) Field of Classification Search
CPC ............. H01M 50/291; H01M 50/249; H01M 50/271; B60K 1/04; Y02E 60/10
See application file for complete search history.

(56) References Cited

U.S. PATENT DOCUMENTS 10,424,770 B2    9/2019   Gunther
10,723,234 B2    7/2020   Gunther
(Continued)

FOREIGN PATENT DOCUMENTS

CN    104712746 A    6/2015
CN    208400905 U   *   1/2019 ............. Y02E 60/10
(Continued)

OTHER PUBLICATIONS

Wang, A Split Battery Pack, Jan. 2019, See the Abstract. (Year: 2019).*
(Continued)

*Primary Examiner* — Anca Eoff
*Assistant Examiner* — Monique M Wills
(74) *Attorney, Agent, or Firm* — Polson Intellectual Property Law P.C.; Margaret Polson; Christopher Sylvain

(57) ABSTRACT

A battery housing for a motor vehicle comprising a base part having a base plate and a cover part having a cover plate. The base part and the cover part delimit a receptacle volume for receiving at least one battery module. The two plates are spaced apart by at least one spacer which is disposed inside the receptacle volume and is supported on the two plates. In the region of at least one support of the spacer, the respective plate has a cut-out. The spacer has an insertion portion which projects into the cut-out and is secured on this plate. The insertion portion projects into the cut-out to the maximum extent that the end face of the insertion portion lies flush with the outer side of the plate.

16 Claims, 3 Drawing Sheets

(51) Int. Cl.
  *H01M 50/24*     (2021.01)
  *H01M 50/249*    (2021.01)
  *H01M 50/262*    (2021.01)
  *H01M 50/271*    (2021.01)
  *H01M 50/291*    (2021.01)

(52) U.S. Cl.
  CPC ....... *H01M 50/249* (2021.01); *H01M 50/262* (2021.01); *H01M 50/271* (2021.01); *B60K 2001/0438* (2013.01)

(56) References Cited

U.S. PATENT DOCUMENTS

| | | |
|---|---|---|
| 10,763,472 B2 | 9/2020 | Gunther et al. |
| 10,843,577 B2 | 11/2020 | Gunther et al. |
| 10,985,422 B2 | 4/2021 | Gunther et al. |
| 11,075,416 B2 | 7/2021 | Günther |
| 11,108,112 B2 | 8/2021 | Gunther et al. |
| 11,205,816 B2 | 12/2021 | Gunther |
| 2020/0295322 A1 | 9/2020 | Gunther |
| 2021/0143497 A1 | 5/2021 | Günther |
| 2021/0265690 A1 | 8/2021 | Günther |
| 2021/0384581 A1 | 12/2021 | Gundogan et al. |
| 2022/0278400 A1 | 9/2022 | Gündogan |
| 2022/0278415 A1 | 9/2022 | Günther |
| 2023/0006297 A1 | 1/2023 | Günther |

FOREIGN PATENT DOCUMENTS

| | | |
|---|---|---|
| CN | 109890632 A | 6/2019 |
| DE | 102015007960 A1 | 12/2016 |
| DE | 102016214289 A1 | 2/2018 |
| DE | 102017100612 A1 | 7/2018 |
| DE | 102018211471 A1 | 9/2019 |
| WO | 2021048051 A1 | 3/2021 |
| WO | 2021048053 A1 | 3/2021 |

OTHER PUBLICATIONS

Examination report dated Dec. 5, 2023 in related Chinese application No. 202080062785.9.
International Search Report dated Mar. 18, 2021 in parent International application PCT/EP2020/074953.
Written Opinion of the International Searching Authority dated Mar. 18, 2021 in parent International application PCT/EP2020/074953. Machine translation provided.
Examination Report dated Jul. 3, 2020 in related German application 10 2019 124 061.1. Machine translation provided.
Examination report dated Jun. 1, 2023 in related Chinese application No. 202080062785.9.

\* cited by examiner

BATTERY HOUSING COMPRISING A SPACER

BACKGROUND

The present disclosure relates to a battery housing for a motor vehicle, comprising a base part having a base plate and a cover part having a cover plate, wherein the base part and the cover part delimit a receptacle volume for receiving at least one battery module, wherein the two plates are spaced apart by at least one spacer which is disposed inside the receptacle volume and is supported on the two plates, wherein in the region of at least one support of the spacer on the two plates, the respective plate has an opening (also referred to herein as a cut-out), wherein the spacer has an insertion portion which projects into the cut-out and the spacer is secured on this plate, and wherein the insertion portion projects into the cut-out to the maximum extent that the end face of the insertion portion lies flush with the outer side of the plate.

Battery housings are used for electric vehicles and hybrid vehicles in order to receive therein batteries or battery modules that are required for electrically driving the vehicle. Such batteries are typically high capacity batteries and are subdivided into several modules. Due to the high energy density, special safety requirements must be met with regard to the securing of the battery housing to the motor vehicle and the strength and rigidity of the battery housing. The requirements in this regard are quite considerable, especially in view of the weight of 700 kg to be accommodated.

Due to their heavy weight, battery modules are preferably arranged in the underfloor region of a motor vehicle, wherein a planar arrangement is preferred for uniform weight distribution so as not to impair the driving behavior of a vehicle. In such an arrangement, a plurality of battery modules are arranged next to each other in a flat configuration. In many cases, the battery housing takes up a large part of the underfloor region of a motor vehicle.

Such a battery housing is composed of a base part and a cover part. Both parts include respective plates that represent the base area of the battery housing and determine the planar extension of the battery housing's receptacle volume. Both plates are connected to one another at their edges via side walls, wherein these side walls may be part of the base part and/or the cover part. A plate carrying such side walls forms a trough. The trough structure can be provided by deforming a blank and may thus be provided in one piece. In other configurations, the trough is composed of the plate and a frame profile, typically made of extruded profiles. Both parts—base part and cover part—are connected to one another in a peripherally sealed manner, for example by means of a screw connection or by gluing the two parts together. For the purpose of the connection, these often have a circumferential, outward-extending mounting flange. The seal is typically gas-, water- and dust-tight.

The battery housing composed of the base part and the cover part encloses a receptacle volume in which battery modules can be received. This receptacle volume is delimited by the inside surfaces of the base plate, the cover plate, and the side walls.

In view of the heavy weight of the battery modules, the typically large surface area of the battery housing, and the requirement for the battery housing to be rigid, it is sometimes necessary to support the base plate in relation to the cover plate and to brace both plates against each other in order to avoid opposite vibrations and to ensure that forces are evenly distributed.

DE 10 2017 100 612 A1 discloses a sleeve-shaped spacer for a battery housing. This spacer is arranged in the receptacle volume enclosed by the battery housing and is supported between the base plate and the cover plate. The base plate and the cover plate each have a cut-out in the region where the spacer is supported, so that a screw bolt can be inserted through the base plate, the sleeve-shaped spacer, and the cover plate. The spacer has an insertion portion that passes through the cut-out in the base plate. The screw head of the screw bolt is supported on the spacer's front face or end face, which is at a distance from the outer side of the base plate. The screw head is supported here on a distal end of the spacer inserted through the base plate. The spacer projecting through the base plate is welded to the base plate on the inside and outer side. The other end of the screw shank projects out of the cut-out in the cover plate with a threaded portion. This threaded portion is used for fastening the battery housing on the vehicle side. The cover plate is braced against the spacer when the screw bolt is tightened in the vehicle-side anchoring. The purpose of the spacer is to prevent the base from being deformed when the screw bolt is tightened. This is also the purpose of the construction of the spacer having a portion projecting from the base part, on which the screw head is supported, so that the force introduced by the screw bolt head acts exclusively on the spacer.

In this previously known configuration, there are several problems: On the one hand, when the battery housing is not mounted on a vehicle, the cover is loose in the region of the spacer and is therefore not tight. On the other hand, there is a desire for an underfloor construction that is as level as possible, so that if the vehicle touches the ground, any projecting components cannot be damaged or even knocked off.

DE 10 2016 214 289 A1 discloses a battery housing with the features of the type mentioned at the outset. In this battery housing, the spacer is formed by at least one strut connecting two side walls. Such a strut has ring-shaped extensions, which respectively engage with a through hole in the base plate and which end flush on the outer side with the outer side of the base plate. Such a strut is connected to the base plate by a weld seam running along its entire length. The strut can also be connected by a welded joint to those side walls which are connected to one another by the struts.

DE 10 2018 211 471 B3 discloses a battery housing in which spacers are provided in the form of sleeves, which are supported on the base plate or the cover plate. The sleeve is held in its intended position inside the battery volume by a bolt passing through the sleeve.

DE 10 2015 907 960 A1 discloses a configuration similar to DE 10 2018 211 471 B3. In this prior art, the connection between the spacer sleeve and the base plate projects beyond the underside of the base plate.

SUMMARY

Based on a battery housing, as disclosed in DE 10 2016 214 289 A1, one aspect of the present disclosure is to provide a battery housing which can be provided with spacers other than struts and which the production thereof is also simplified.

This is achieved by a generic battery housing for a motor vehicle of the type mentioned at the outset, wherein the end face of the insertion portion of the spacer is materially connected to the plate with the center of the weld seam arranged on the end face of the insertion portion of the spacer.

The term "insertion portion" used in the context of the present disclosure refers to that portion of the spacer which, starting from the plane of the inside of the plate, projects into the opening (also referred to herein as the cut-out).

The spacer arranged in the battery housing does not project on the outer side from the cut-out in the base plate or the cover plate. Advantageously, this means that the end face formed by the material of the spacer is arranged inside the cut-out, while at the same time avoiding parts of the spacer projecting from the plate on which this support arrangement is provided, projecting from the battery housing.

The insertion portion preferably rests with its outer lateral surface at least in portions on the lateral surface of the cut-out. By the mutual contacting of the two lateral surfaces, a positive fit acting in the plane of the plate is formed between the spacer and the plate. The cut-out forms an abutment. This simplifies the positioning of the spacer on the plate to be supported. The insertion portion preferably has the same cross-sectional geometry as the cut-out. The lateral surface of the insertion portion can then rest circumferentially against the lateral surface of the cut-out. Also conceivable is a configuration in which the lateral surface of the insertion portion is supported in at least two regions on the lateral surface of the cut-out. Such a support is sufficient to ensure alignment of the spacer in order to simplify the assembly.

The spacer is secured on the plate in order to ensure a pressure-resistant and tension-resistant support in the axial direction of the spacer. In a preferred embodiment, such a securing can be provided by material fit or positive fit.

The end face of the insertion portion of the spacer pointing to the outer side of the plate is materially connected to the plate. In this way, the spacer can be materially connected to the plate from the outside. In principle, joining on the inner side is not necessary. The welding process is typically a MIG, MAG or laser welding process. The arc is typically ignited on the more massive component. In this case, the arc is ignited on the end face of the insertion portion of the spacer. In this way, the weld pool is initially formed during the welding process on the end face, namely by melting the material of the spacer. This melt connects to the hole edge regions of the cut-out when the melt reaches them. As a result, the edge region of the hole is typically also melted or partially melted, but without an arc being directed onto the plate, which is generally thinner than the spacer material available for the intended weld. The risk of accidental melt-through is thus effectively prevented. In the welded joint, the center of the resulting weld seam is on the end face. It was recognized that by using the material provided by the spacer to form a weld seam, a possible welding distortion in the battery housing, in particular with regard to the plate, can be reduced, thus providing a greater process reliability, which also has a positive effect on the sealing of the battery housing. Otherwise, the arc is effective in the direction of the axial extension of the spacer and thus in a direction in which an accidental melt-through cannot occur.

It is also possible for the insertion portion to only partially project into the cut-out in the plate, so that its end face is not flush with the outer side of the plate but is located inside the cut-out. As a result, the end face of the insertion portion and the outer surface of the cut-out form a step in which a weld seam can be placed as a fillet seam. In such a configuration, the end face of the insertion portion is materially connected to the lateral surface of the cut-out.

Due to the material connection between the spacer and the plate, the spacer is supported on the plate in the axial direction. If the weld is circumferential and continuous, the connection is also tight, typically gas-tight.

In order to evenly introduce heat during the welding process, the outer surface of the spacer is aligned with the cut-out in the region of the transition from the spacer to the plate, without the spacer having a projection that rests on the inside of the plate. This avoids excessive heat input into the plate.

In an alternative embodiment, which can also be used in addition to the embodiment described above, the spacer is connected to the plate via a positive fit, in particular by a screw connection on the plate. To this end, the spacer has a support surface contacting the inside of the plate, for example a step, and an internal thread provided in its end face. The spacer is secured on the plate by means of a screw connection engaging with the internal thread and having a head or collar which acts against the outer side of the plate. A screw connection is particularly advantageous when the base part is to be separated from the cover part for disassembling purposes. The screw connection, which is independent from additional assembly steps, also ensures that the battery housing can also be transported in a sealed, in particular gas-tight manner.

The screw connection can be provided by a sleeve which is provided in a portion of its outer lateral surface with an external thread meshing with the internal thread of the spacer, and which is provided with a collar acting against the outer side of the plate. It goes without saying that the collar, at least in portions, has a larger diameter than the smallest diameter of the cut-out in the plate. Positioning aids provided on the side of the vehicle body can engage in the sleeve. The weight of the battery housing is also reduced in this way.

Furthermore, the sleeve can be designed as an internally threaded sleeve, so that the battery housing can be fastened to the body of the vehicle by means of a screw connection engaging in the internal thread of the sleeve. Such a configuration opens up the possibility of attaching the battery housing to the vehicle from the vehicle body side.

In order to ensure the sealing of the securing region, a seal can be arranged between a collar of the screw connection acting against the outer side of the plate and the plate, so that the screw connection is protected from any environmental agents. Such a seal can be implemented using a sealing compound, a solid seal, or an adhesive bond. Corrosion problems in the screw connection are thus avoided. There is also the possibility of arranging a seal between the end face of the spacer, which supports the plate on the inside, and the plate. It can be provided so that the end face has a groove into which the seal, for example an O-ring, can be inserted. Thus, provided the connection between the base part and the cover part is also gas-tight, the battery housing can be gas-tight in the region of the spacer supports, despite having a cut-out provided therein.

In principle, the spacer can be provided as a sleeve body. If the spacer is integral with the plate or connected thereto by means of a sleeve, the inner hollow chamber of the spacer opens out on the outer side of the plates of the battery housing, which allows the insertion of a screw bolt through the spacer in order to secure the battery housing to the vehicle.

It goes without saying that the spacer can be supported on the other plate in the same way. There is also the possibility of designing the support on the other plate differently. If the support arrangement described is located, for example, on the cover plate, the support on the corresponding opposite base plate can be provided either by the spacer itself or by a strut inserted into the trough structure of the base part, on which a spacer element is placed. Thus, the spacer is formed by the strut and the spacer element, which is placed on top of the strut.

In one embodiment, the connection of the spacer to the other plate of the battery housing is characterized in that it is supported with its end face on the other plate and said plate has a cut-out in the region of this support, wherein the end face of the spacer projects circumferentially beyond the edge of the cut-out radially inwards in the plane of support of the end face on the plate and the spacer is secured on this plate.

The spacer is thus supported on the plate with its end face formed by its material. The spacer thus lies inside on the plate to be supported. In one embodiment, this support can be direct, so that the end face contacts the plate. In another embodiment, a seal, for example an O-ring, is arranged between the end face and the plate. Such a seal can be arranged in a groove on the face of the spacer, for easy assembly.

In the region of the spacer, the plate, which is supported on the face of the spacer, has a cut-out. The geometry of the end face of the spacer and that of the cut-out are matched to one another in such a way that the end face supported on the inside of the plate extends beyond the edge of the cut-out. Thus, the end face projects beyond the edge of the cut-out towards the center of the cut-out. Thus, the spacer is supported only with a part of its face on the inside of the plate. Another part of its end face projects beyond the edge of the cut-out.

An extremely simple and effective tolerancing of the spacer relative to the plate to be supported is realized by this configuration. The spacer can be displaced to the extent that its end face in the plane of its support on the plate in the direction of the center of the cut-out projects into the latter, for correct positioning relative to the plane of the plate and thus for tolerance compensation in the plane of the support. The end face of the spacer thus also represents a tolerance compensation region with regard to the support of the spacer on the plate. It is notable that this is possible due to the peripheral support without leaks or undercuts. The outer shape of the end face preferably corresponds to the shape of the cut-out. This provides optimal utilization of the available area for tolerance compensation. If the spacer is designed with an end face provided by a sleeve portion, the end face is to be understood as that region which is provided by the material of the sleeve.

In the context of the descriptions relating to this embodiment, if a cut-out in the plate in the support region of the end face of the spacer is mentioned, this cut-out can also be provided by a plurality of cut-outs, typically arranged in a grid. In such a case, the enclosing lateral surface of these cut-outs can represent the edge over which the end face of the spacer extends.

The spacer is secured on the supported plate. In one configuration, the securing takes place by means of a material joining method, for example by welding, preferably by means of a MIG or MAG welding method. A laser welding method is also conceivable. This takes advantage of the step provided by the projection of the face of the spacer beyond the edge of the cut-out from the outer side of the plate. A fillet weld can be placed therein. If the weld seam is provided over the entire circumference of the cut-out, as is mostly the case, the required sealing is hereby also guaranteed.

In another configuration of this embodiment, which can also be used in addition to the welding process described above, the spacer is screwed to the plate. For this purpose, the spacer has an internal thread which opens into its end face supported on the plate. A screw connector can be screwed into this internal thread. The plate is arranged between the screw head and the end face of the spacer, so that the spacer clamps the plate from the inside and the screw head clamps the plate from the outside when the screw connector is tightened. In this configuration, a seal can be fitted between the outer side of the plate and the screw head, for example in the form of an O-ring. Of course, in addition to the already mentioned solid seal, a sealing compound can also be used as a seal. Such an external seal has the advantage that any environmental agents not only cannot penetrate into the battery housing but are also kept out of the threaded region. This facilitates a possible disassembly since corrosion problems between the meshing threads are avoided. It is also possible to seal the thread.

The screw connector can be a screw bolt, for example. In another configuration, the screw connector is a screw sleeve. In such a configuration, the sleeve has a support flange at the end that projects radially outwards and represents the screw head of such a screw connector. Additional possibilities result from the use of a sleeve: if the spacer itself is a sleeve, the freedom of movement created in this way can be used for heat dissipation of heat generated inside the receptacle volume. Such a screw connector designed as a sleeve body can have an internal thread for fixing. Thus, the battery housing can be fixed to the vehicle side by screws brought in from the vehicle side. With such a configuration, there are no elements projecting from the underside of the base part, despite the screw connection.

The above-described spacer of this embodiment can be shifted with respect to its position in relation to the plate to be supported, without causing any disadvantages in terms of load-bearing capacity or assembly options. At the same time, it is possible to provide a cut-out in the plate at the position of a spacer, which can be easily and securely sealed off from the receptacle volume by the spacer, and which in particular can also be made gas-tight. The described support of the spacer on the base plate or the cover plate is already tight and protected from any environmental influences when a battery housing is delivered.

In one configuration of such a battery housing, the spacer, and the base plate and/or the cover plate are made from the same material. This does not mean that these elements are made of identical materials, but that they belong to a material group, such as steel components. This is advantageous in terms of avoiding galvanic corrosion and also brings advantages when joining.

BRIEF DESCRIPTION OF THE DRAWINGS

The present disclosure is described below by way of example with reference to the accompanying figures, wherein.

DETAILED DESCRIPTION

Figure 1:
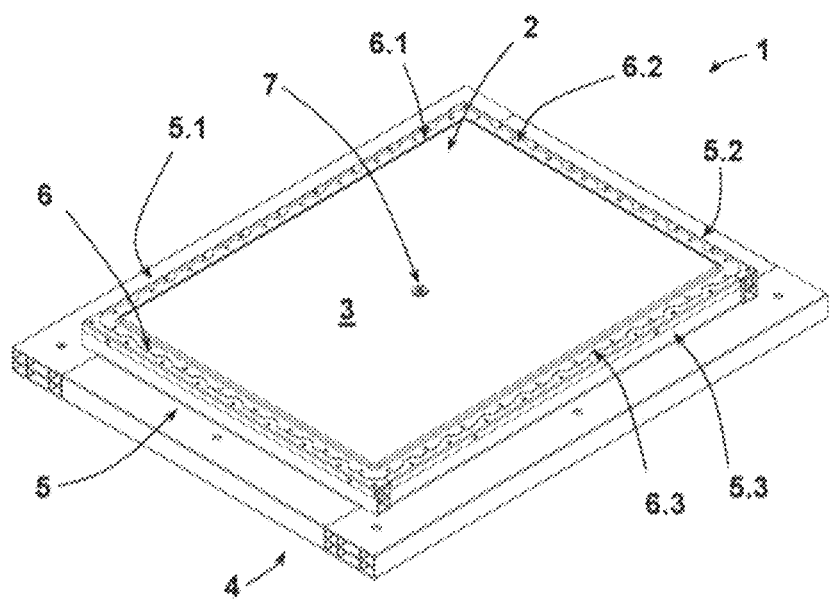
FIG. 1 shows a perspective view of a closed battery housing with a base part and a cover part.

FIG. 1 shows a battery housing 1 whose longitudinal extension and transverse extension are significantly greater than its height extension. The battery housing 1 has a relatively large planar extension of, for example, 1×2 m. The battery housing 1 has a cover part 2. The cover part 2 comprises a cover plate 3, which extends in a plane forming a base of the battery housing 1. The cover part 2 is connected to a base part 4. The base part 4 comprises side walls 5, 5.1, 5.2, 5.3 and a base plate which is not visible in this view. The side walls 5, 5.1, 5.2, 5.3 are provided by a housing frame made from individual extruded profile parts. The cover part 2 is screwed peripherally at its edges 6, 6.1, 6.2, 6.3 to the side walls 5-5.3. In addition, the cover plate 3 is supported in its center in relation to the base plate (not visible in FIG. 1) by means of a spacer (not visible in FIG. 1). The cover plate 3 is connected to the spacer by means of a fastener 7.

Figure 2:
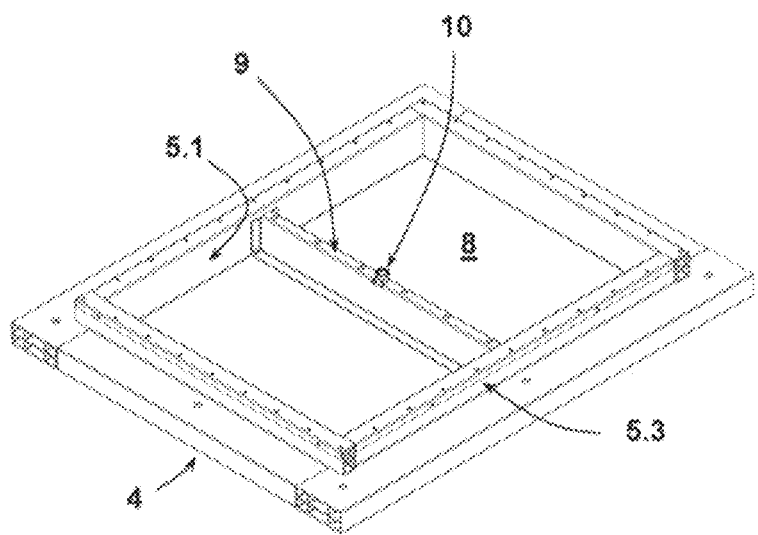
FIG. 2 shows the battery housing of FIG. 1, with the cover part removed.

FIG. 2 shows the battery housing 1 of FIG. 1 with the cover part 2 removed. The base plate 8 of the base part 4 can be seen, which, like the cover plate 3, extends planarly forming the base of the battery housing 1 in a plane. The space that is enclosed by the battery housing 1 when the cover part 2 is mounted with the base part 4 is referred to as the receptacle volume, into which battery modules (not shown in the figures) can be inserted. In addition, a transverse strut 9 connecting the side walls 5.1, 5.3 is arranged in the base part 4. A spacer 10 is inserted in the transverse strut 9.

Figure 3:
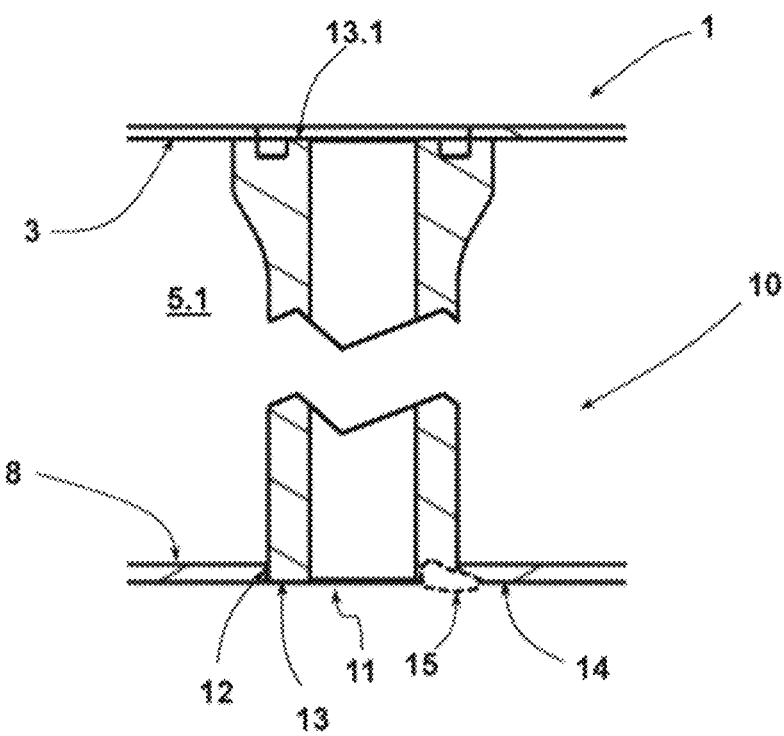
FIG. 3 shows a sleeve-shaped spacer in a first embodiment, which is fastened to the battery housing in the lower region by a welded connection.

The spacer 10 is shown in detail in FIG. 3. For the sake of clarity, the transverse strut 9 is not shown in this figure. The sleeve-shaped spacer 10 is spaced from the side walls 5, 5.1, 5.2, 5.3 of the battery housing 1 and is located inside the receptacle volume, specifically in the illustrated embodiment in the center of the receptacle volume. In this embodiment, the spacer 10 is a sleeve-shaped body which is welded to the base plate 8.

In the region in which the spacer 10 is arranged on the base plate 8, the base plate 8 has a cut-out 11. The spacer 10 projects with an insertion portion 12 into the cut-out 11. In this embodiment, the end face 13 of the insertion portion 12 is flush with the outer side 14 of the base plate 8. In this embodiment, the end face 13 is the end face of the spacer 10. The cut-out 11 has a diameter which is larger than the insertion portion 12 of the spacer 10 by the amount of mounting clearance required. As a result, the lateral surface of the insertion portion 12 is in contact with the lateral surface of the cut-out 11. The cut-out 11 is used as a positioning hole for aligning the spacer 10 with respect to the base plate 8.

In order to secure and support the spacer 10 on the base plate 8, the spacer 10 is peripherally welded to the base plate 8 from the outer side of the base part 2. The required sealing is also guaranteed by the circumferential weld seam. A MIG, MAG or laser welding process is used as the welding process. A laser welding process is also conceivable. During the welding process, the material provided by the spacer 10 is used in the region of the insertion portion 12 or the end face 13 in order to provide a weld pool. For this purpose, the arc is ignited on the end face 13. The weld pool forming on the end face 13 is connected to the base plate 8, wherein the hole edge region of the base plate 8 enclosing the cut-out 11 is preferably only partially melted. As a result, the spacer 10 is secured to the base plate 8 with a weld seam, the center of which, i.e., the starting center of the weld pool, is arranged on the end face 13. This weld seam is indicated in outline with reference numeral 15 on the right half of the spacer 10 in FIG. 3. By directing the arc onto the end face 13 of the spacer 10, the risk of the relatively thin base plate 8 melting through is cleverly avoided. The longitudinal extension of the spacer 10 in the region of its insertion portion 12 thus represents a sufficient material reservoir. An accidental melting through of the sleeve jacket of the spacer 10 is avoided since the arc is directed in the direction of the material extension of the spacer 10. The heat emanating therefrom is sufficient to melt the hole edge regions of the cut-out 11 for providing the desired joint connection. Moreover, this measure and the resulting reduction in heating of the base plate prevent warping of the same or at least reduce it to a minimum.

The spacer 10 has a channel passing through it. A screw bolt, not shown in detail, can be inserted through this component to fasten the battery housing 1 to a vehicle.

Figure 4:
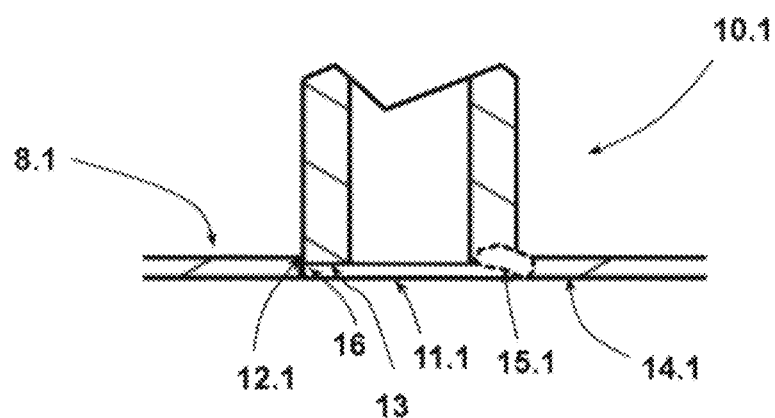
FIG. 4 shows a sleeve-shaped spacer according to another embodiment, which is fastened to the battery housing in the lower region by a welded connection.

FIG. 4 shows the connection between a further spacer 10.1 and a base plate 8.1 according to an alternative configuration. In this configuration, the insertion portion 12.1 only partially projects into the cut-out 11.1. Its end face 13.1 is thus located inside the cut-out 11.1 and is adjacent to its lateral surface 16. The end face 13.1 which is set back relative to the outer side of the base plate 8.1 forms a step forming a groove together with the lateral surface 16 of the cut-out 11.1. In this configuration, this is used to delimit a circumferential fillet weld seam 15.1, the schematic outline of which is shown in broken lines only on the right-hand side of the cut-out 11.1 in FIG. 4. In order to ensure that the weld seam is sealed, MIG, MAG or laser welding processes may also be used here as welding processes. The groove ensures the formation of a secure, particularly tight and continuous weld connection, without impairing the inner or outer lateral surface of the spacer 10.1. This is of interest in relation to the inner lateral surface of the spacer 10.1 if the sleeve channel is to be used for a screw connector passing through. The fillet weld does not project in the direction of the longitudinal extension of the spacer 10.1, so that the head of a screw connector can be brought into abutment against the edge regions of the cut-out 11.1 of the base plate 8.1 on the outer side of the base plate 8.1.

Figure 5:
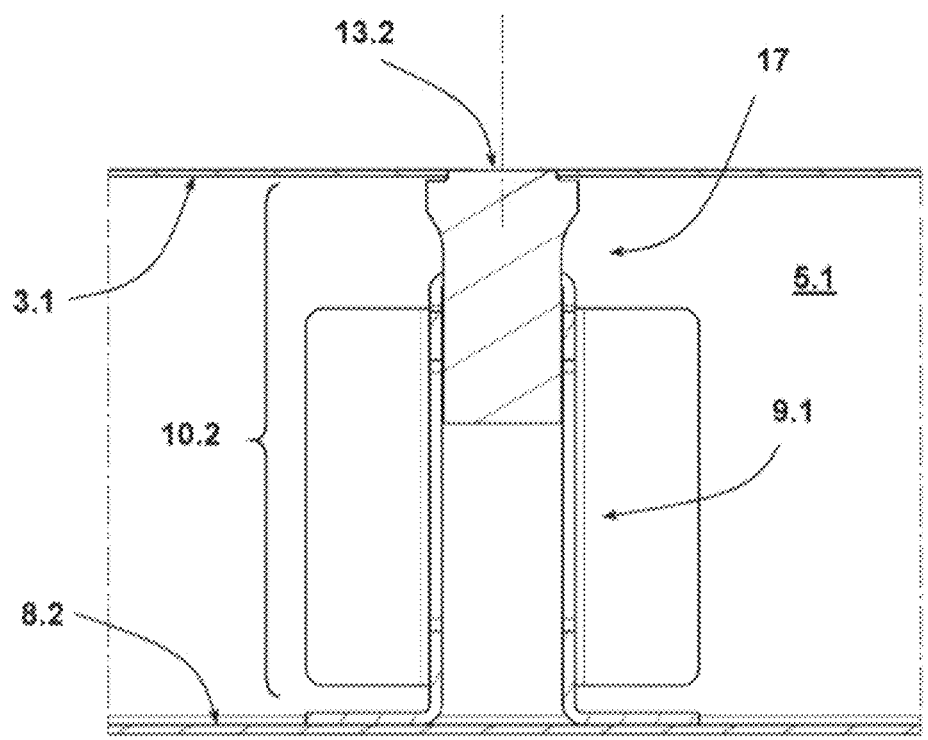
FIG. 5 shows a spacer according to a further embodiment, which is fastened by a transverse strut located in the receptacle volume of the battery housing and a spacer element.

Another alternative configuration is shown in FIG. 5. The spacer 10.2 of this embodiment is provided by a transverse strut 9.1 and a spacer element 17 connected thereto. The transverse strut 9.1 is inserted into a base part of a battery housing in exactly the same way as described in the case of the transverse strut 9 of embodiments 1 to 3. The spacer element 17 is fastened to the transverse strut 9.1 by means of a weld. The connection to the cover plate 3.1 takes place in accordance with one of the configurations described above. In the illustrated embodiment, the end face 13.2 of the spacer element 17 lies flush with the outer side 14.1 of the cover plate 3.1. This spacer 10.2 is supported on the base plate 8.2 with support legs of the transverse strut 9 being flared outwards.

The invention has been explained by way of example embodiments. Without departing from the applicable scope of protection as defined in the claims, numerous other embodiments and possibilities for implementing the subject matter of the invention will become apparent to a person skilled in the art, without these having to be explained or shown in more detail in the context of the present disclosure.

REFERENCE NUMERALS 1 battery housing
2 cover part 3, 3.1 cover plate
4 base part
5-5.3 side walls
6-6.3 edge of the cover part
7 spacer fastener
8, 8.1, 8.2 base plate
9, 9.1 transverse strut
10, 10.1, 10.2 spacer
11, 11.1 cut-out
12, 12.1 insertion portion
13, 13.1, 13.2 end face
14, 14.1 outer side of the base plate
15, 15.1 weld seam
16 lateral surface of the cut-out
17 spacer element

The invention claimed is:

1. A battery housing for a motor vehicle, comprising:
a base part having a base plate and a cover part having a cover plate, wherein the base part and the cover part delimit a receptacle volume for receiving at least one battery module, and wherein the base plate and the cover plate are spaced apart by at least one spacer which is arranged inside the receptacle volume and supported on both the base and cover plates,
wherein at least one plate of the base plate and the cover plate has an opening in a region of support of the spacer, and wherein the spacer has an insertion portion which partially or fully extends into the opening, with a maximum extent to which the insertion portion extends into the opening being such that an end face of the insertion portion lies flush with an outer side of the plate, and
wherein the end face of the insertion portion is materially connected to the plate with a weld seam, and a center of the weld seam is arranged on the end face of the insertion portion of the spacer.

2. The battery housing of claim 1, wherein the spacer is a sleeve body.

3. The battery housing of claim 1, wherein an outer lateral surface of the insertion portion rests at least in part on a lateral surface of the opening.

4. The battery housing of claim 3, wherein the insertion portion only partially extends into the opening in the plate, such that the end face of the insertion portion and the lateral surface of the opening form a step, and wherein the end face of the insertion portion is materially connected to the lateral surface of the opening.

5. The battery housing of claim 1, wherein the insertion portion only partially extends into the opening in the plate, such that the end face of the insertion portion and a lateral surface of the opening form a step, and wherein the end face of the insertion portion is materially connected to the lateral surface of the opening.

6. The battery housing of claim 1, wherein the spacer has a support surface which contacts an inner side of the plate, the spacer has an internal thread brought into the spacer through the end face of the spacer, and the spacer is secured on the plate via a screw connection engaging in the internal thread and acting against the outer side of the plate.

7. The battery housing of claim 6, wherein the screw connection comprises a sleeve having an external thread which engages with the internal thread of the spacer, and the sleeve has a collar which acts against the outer side of the plate.

8. The battery housing of claim 7, wherein the sleeve is an internally threaded sleeve.

9. The battery housing of 21, wherein a seal is arranged between the plate and the collar acting against the outer side of the plate.

10. The battery housing of claim 6, wherein the screw connection comprises a collar which acts against the outer side of the plate, and a seal is arranged between the plate and the collar.

11. The battery housing of claim 1, wherein the opening of the plate has the same cross-sectional geometry as the end face of the spacer.

12. The battery housing of claim 1, wherein a seal is arranged between the end face and the plate.

13. The battery housing of claim 1, wherein the receptacle volume is circumferentially sealed.

14. The battery housing of claim 1, wherein the spacer is made of the same material as the plate.

15. The battery housing of claim 1, wherein part of the spacer is a strut inserted in the base part or the cover part with at least one spacer element connected to the strut.

16. The battery housing of claim 1, wherein the spacer is secured on both the base and cover plates.

* * * * *